US012573753B2

(12) United States Patent
Xie et al.

(10) Patent No.: US 12,573,753 B2
(45) Date of Patent: Mar. 10, 2026

(54) MINIATURE LOW PROFILE HARSH ENVIRONMENT WIRELESS SENSOR WITH TUNABLE ANTENNA

(71) Applicant: Applied Materials, Inc., Santa Clara, CA (US)

(72) Inventors: Qianyi Xie, Sunnyvale, CA (US); Chuang-Chia Lin, San Ramon, CA (US)

(73) Assignee: Applied Materials, Inc., Santa Clara, CA (US)

(*) Notice: Subject to any disclaimer, the term of this patent is extended or adjusted under 35 U.S.C. 154(b) by 146 days.

(21) Appl. No.: 18/388,492

(22) Filed: Nov. 9, 2023

(65) Prior Publication Data

US 2025/0158279 A1 May 15, 2025

(51) Int. Cl.
*H01Q 5/10* (2015.01)
*H01Q 1/38* (2006.01)

(52) U.S. Cl.
CPC ................. *H01Q 5/10* (2015.01); *H01Q 1/38* (2013.01)

(58) Field of Classification Search
CPC ............. H01Q 5/10; H01Q 1/38; H01Q 5/314
See application file for complete search history.

(56) References Cited

U.S. PATENT DOCUMENTS

| | | | |
|---|---|---|---|
| 9,019,165 B2 | 4/2015 | Shtrom et al. | |
| 9,634,639 B2 | 4/2017 | Ramirez et al. | |
| 2012/0026066 A1 | 2/2012 | Leisten | |
| 2013/0065543 A1* | 3/2013 | Ayatollahi | H01Q 1/243 455/90.3 |
| 2019/0385875 A1* | 12/2019 | Wu | H01J 37/3211 |

OTHER PUBLICATIONS

International Search Report and Written Opinion for International Application No. PCT/US2024/053397 dated Feb. 9, 2025, 13 pages.

* cited by examiner

*Primary Examiner* — David E Lotter
(74) *Attorney, Agent, or Firm* — Schwabe, Williamson & Wyatt, P.C.

(57) ABSTRACT

Embodiments disclosed herein include an antenna with a dielectric substrate with a first surface and a second surface. An electrically conductive first pad is on the first surface, and a plurality of traces are on the first surface. In an embodiment, lengths of the plurality of traces are non-uniform. An electrically conductive second pad is on the second surface, and a first hole is through the first pad, the substrate, and the second pad. A first liner is along sidewalls of the first hole and electrically couples the first pad to the second pad. A second hole is through the first pad and the substrate, and a second liner is along sidewalls of the second hole to electrically couple the first pad to an electrically conductive third pad on the second surface. In an embodiment, an electrically insulating ring is between the second pad and the third pad.

9 Claims, 10 Drawing Sheets

MINIATURE LOW PROFILE HARSH ENVIRONMENT WIRELESS SENSOR WITH TUNABLE ANTENNA

BACKGROUND

1) Field

Embodiments relate to the field of semiconductor manufacturing and, in particular, to low profile wireless sensors with tunable and compact antennas.

2) Description of Related Art

As electronic devices (e.g., integrated circuits, memories, and other semiconductor based devices) continue to scale to include smaller and higher density features, process control increases in importance. Many semiconductor manufacturing processes are implemented in a processing chamber, such as a vacuum processing chamber. The sealed environment makes it difficult to provide necessary measurements of various processing parameters. In some instances, the processing environment (e.g., a plasma environment) is harsh. This further increases the difficulty of including sensor devices into the chamber. The form factor of the sensor is also an important consideration. For example, a distance between the showerhead of the chamber and the substrate being processed can be exceedingly small. As such, the sensor and any associated antenna need to have small thicknesses.

Due to the harsh environment of many semiconductor processing environments (e.g., high temperatures, low temperatures, low pressures, highly reactive chemical species, etc.) the sensors need to be robust. This makes it difficult to package memory devices, batteries, and the like into the sensor system. Accordingly, the use of a passive sensor and a passive antenna may be desirable. However, such solutions are typically larger and may run into form factor limitations.

SUMMARY

Embodiments disclosed herein include an antenna. In an embodiment, the antenna comprises a dielectric substrate with a first surface and a second surface opposite from the first surface. In an embodiment, an electrically conductive first pad is on the first surface, and a plurality of traces are on the first surface. In an embodiment, lengths of the plurality of traces are non-uniform. In an embodiment, an electrically conductive second pad is on the second surface, and a first hole is through the first pad, the substrate, and the second pad. A first liner is along sidewalls of the first hole and electrically couples the first pad to the second pad. In an embodiment, a second hole is through the first pad and the substrate, and a second liner is along sidewalls of the second hole to electrically couple the first pad to an electrically conductive third pad on the second surface. In an embodiment, an electrically insulating ring is between the second pad and the third pad.

Embodiments further comprise an apparatus that comprises a substrate, and a sensor over the substrate. In an embodiment, an antenna is over the substrate and is communicatively coupled to the sensor. In an embodiment, the antenna comprises a plurality of traces of different lengths that are configured to be selectively coupled into an antenna circuit in order to select an operating frequency bandwidth for the antenna that is compatible with the sensor.

Embodiments further comprise an apparatus that comprises a chamber, and a sensor in the chamber. In an embodiment, an antenna is in the chamber and is communicatively coupled to the sensor. In an embodiment, the antenna is configured to be tunable to an operating frequency range of the sensor.

DETAILED DESCRIPTION

Systems described herein include low profile wireless sensors with tunable and compact antennas. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Further-more, it is to be understood that the various embodiments shown in the accompanying drawings are illustrative representations and are not necessarily drawn to scale.

As noted above, process monitoring within a semiconductor processing chamber is difficult. The combination of a harsh processing environment, form factor constraints, and the need to keep a sealed chamber results in significant limitations in the design of sensor devices. Accordingly, embodiments disclosed herein may include sensor modules that are compatible within extreme temperature ranges (e.g., between approximately −50° C. and approximately 400° C.). The sensor modules may also have a compact form factor (e.g., less than one square inch in area with a thickness less than 5 mm). Further, integrated power and memory solutions may be omitted. Instead, the sensors may be powered through RF energy and the data collected by the sensor may be transmitted out of the chamber through an antenna. Such, sensor modules may be integrated on a substrate (e.g., with a typical wafer form factor). In other embodiments, the sensor modules may be integrated or otherwise attached to interior surfaces of the processing chamber.

One advantage of embodiments disclosed herein is that the antennas in the sensor modules can be made in a cost effective manner. For example, a common antenna can be designed that is compatible with many different sensor modules. Particularly, the antenna can be configured to work over a large range frequency bandwidth (e.g., a bandwidth of hundreds of MHz or more). When paired with a particular sensor, the antenna can be configured to operate in a narrower band to accommodate the frequency of the sensor. In some embodiments, the configuration is permanent. In other embodiments, the antenna can be reconfigurable to match different sensor architectures. Accordingly, the antennas can be mass produced in order to reduce costs.

In an embodiment, the sensor modules can be selected to provide sensing of many different properties within a chamber environment. For example, sensors can be chosen for measuring one or more of temperature, surface conditions (e.g., moisture, coating thicknesses), chamber wall conditions, or plasma properties (e.g., radical density, electron density, etc.). In some embodiments, the sensor modules may include a plurality of sensor and antenna pairs. The pairs may all include the same type of sensor, or the pairs may include two or more different types of sensors.

Figure 1A:
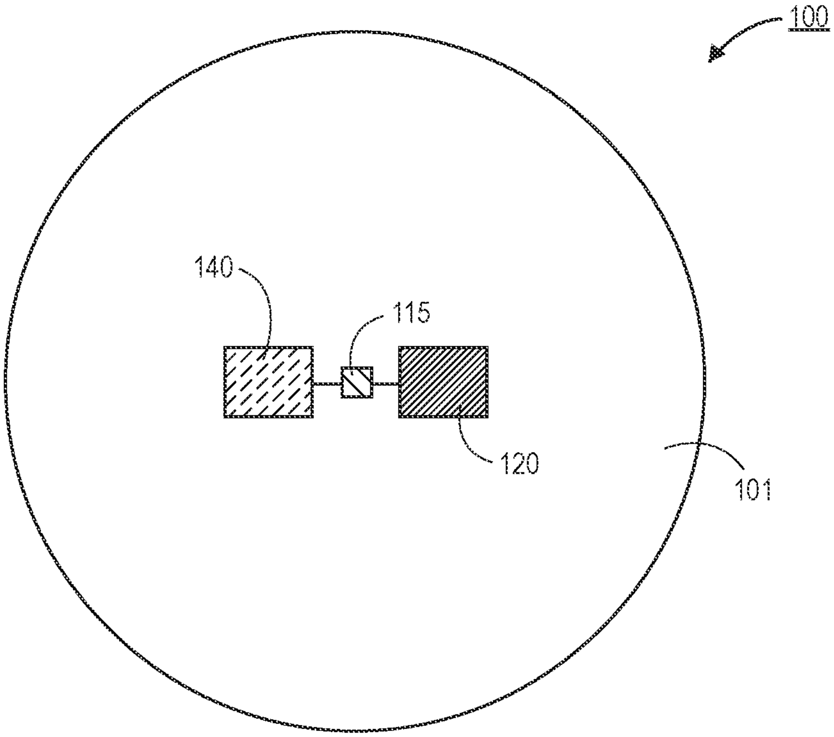
FIG. 1A is a plan view illustration of a sensor module with a substrate, a sensor, a match, and an antenna, in accordance with an embodiment.

Referring now to FIG. 1A, a plan view illustration of a sensor module 100 is shown, in accordance with an embodiment. In an embodiment, the sensor module 100 includes a substrate 101. In the illustrated embodiment, the substrate 101 is shown as having a wafer-like form factor. For example, the substrate 101 may have a 300 mm diameter, a 450 mm diameter, or the like. Though, in other embodiments, the substrate 101 may have other shapes and/or dimensions.

In an embodiment, the substrate 101 may comprise a material or materials that are compatible with semiconductor manufacturing processes within a chamber. For example, the substrate 101 may be compatible with temperatures up to approximately 400° C. and low pressures (e.g., 1.0 mTorr or lower). The substrate 101 may also be resistant to plasma processing environments. In some embodiments, the substrate 101 may comprise silicon (e.g., a silicon wafer) or other semiconductor materials. The substrate 101 may also include ceramic materials, glass materials, metallic materials, or the combination of multiple different classes of materials.

In an embodiment, the sensor module 100 may comprise a sensor 140 and an antenna 120. The sensor 140 may be communicatively coupled to the antenna 120. For example, one or more electrically conductive traces (e.g., on the substrate 101) may couple the sensor 140 to the antenna 120. Electrically conductive wires or other connectors may also couple the sensor 140 to the antenna 120. In an embodiment, a matching element 115 may be provided between the sensor 140 and the antenna 120 as well. The matching element 115 may be any device that is configured to match the electrical impedance between the sensor 140 and the antenna 120 in order to allow for efficient data transfer between the two components.

The matching element 115 may comprise any passive or active circuitry necessary to provide the matching functionality. For example, the matching element 115 may comprise one or more of capacitors, inductors, resistors, or the like. In some embodiments, the matching element 115 may simply comprise a resistor. For example, the matching element 115 may be embodied as an electrically conductive trace or wire that connects the sensor 140 to the antenna 120.

Figure 1B:
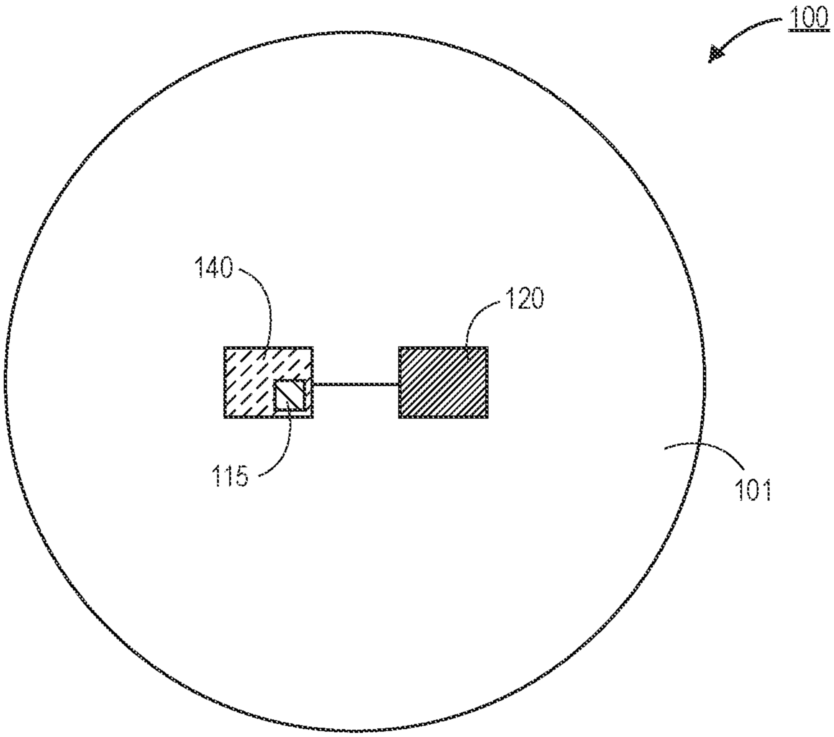
FIG. 1B is a plan view illustration of a sensor module with a match integrated into the sensor and coupled to an antenna, in accordance with an embodiment.
Figure 1C:
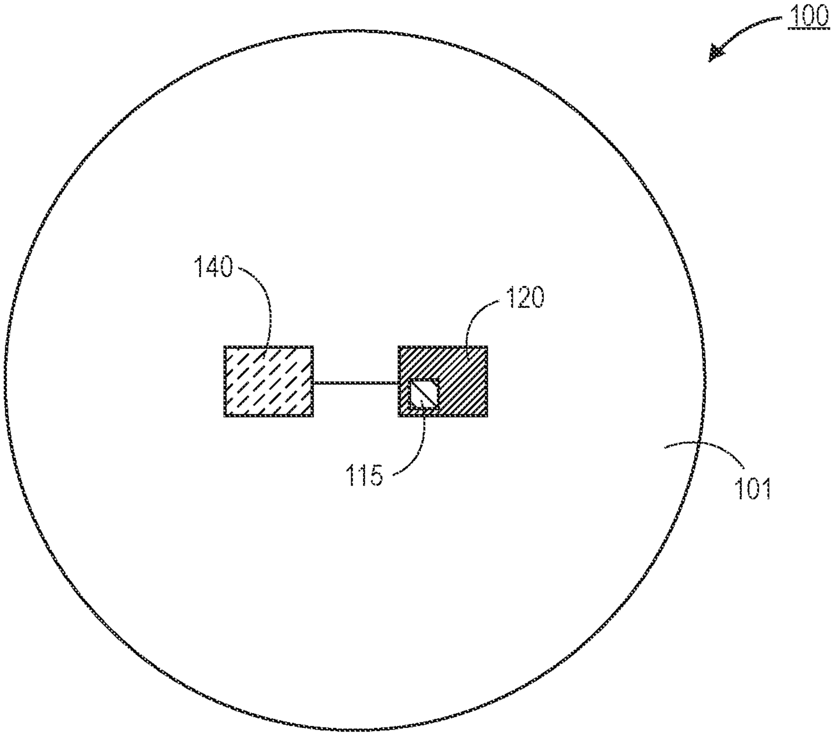
FIG. 1C is a plan view illustration of a sensor module with a match integrated into an antenna that is coupled to a sensor, in accordance with an embodiment.
Figure 1D:
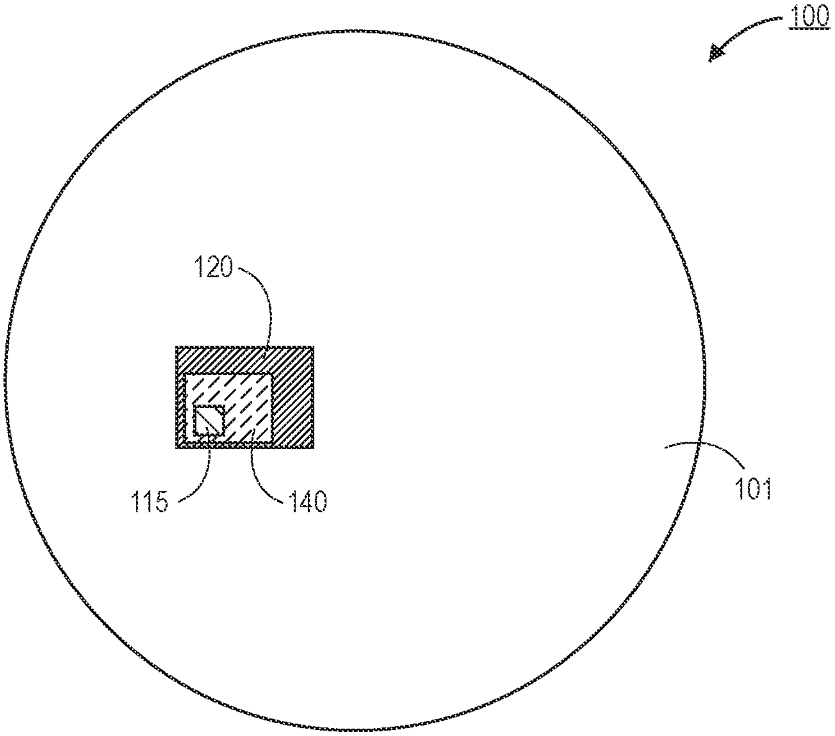
FIG. 1D is a plan view illustration of a sensor module with a sensor and an antenna stacked over the sensor, in accordance with an embodiment.

In FIG. 1A the matching element 115 is illustrated as being between the sensor 140 and the antenna 120. However, embodiments are not limited to such configurations. For example, FIGS. 1B and 1C show alternative embodiments. In FIG. 1B, the sensor module 100 may include a matching element 115 that is integrated as part of the sensor 140. FIG. 1C shows an alternative embodiment where the matching element 115 is provided as part of the antenna 120. FIG. 1D illustrates a sensor module 100 with a stacked arrangement. In such an embodiment, the antenna 120 may be provided as a base, and the sensor 140 may be stacked above the antenna 120. A matching element 115 may be integrated within wither the antenna 120 and/or the sensor 140. While four examples are shown in FIGS. 1A-1D, it is to be appreciated that embodiments may also include matching elements 115 provided in multiple locations in and/or between the sensor 140 and the antenna 120. For example, the circuitry of the sensor 140, the antenna 120, and any connection between the two may be designed in order to reduce or eliminate impedance mismatch.

In an embodiment, the sensor 140 of the sensor module 100 may include any suitable type of sensor. That is, the sensor 140 may be used to measure many different conditions or properties within a processing chamber. In one instance, the sensor 140 may be a temperature sensor, such as, but not limited to, a thermocouple, a diode, a resistance temperature detector, or the like. Other types of sensors 140 may include a sensor for measuring a surface condition such as surface moisture or a surface coating. A thickness, a change in a thickness, or a composition of the surface coating may be measured by the sensor 140. In other embodiments, the sensor 140 may be used in order to monitor plasma properties within the chamber. For example, radical densities and/or electron densities of the plasma may be monitored by the sensor 140. In an embodiment, the sensor 140 may be a passively operated resonator comprising one or more of a surface acoustic wave (SAW) resonator, a bulk acoustic wave (BAW) resonator, a laterally excited bulk acoustic resonator (XBAR), or a lamb wave resonator.

In an embodiment, the sensor 140 may be configured so that an integrated power source (e.g., a battery, capacitive energy storage, etc.) is not needed in order to operate the sensor 140. Since a battery is not necessary, the sensor 140 may be able to operate in more extreme temperature conditions. While a battery is not necessary in some embodiments, it is to be appreciated that the sensor 140 may include an integrated or internal power source in some embodiments. Instead of relying on an internal or integrated power source, the sensor 140 may be configured to operate in response to a wireless power supply. For example, RF power may be applied from outside of the sensor module 100 (e.g., outside of the chamber) in order to drive the sensor 140. Other wireless power supplies (e.g., inductive coupling, capacitive coupling, magnetic coupling, etc.) may also be used for the sensor module 100.

In an embodiment, the antenna 120 may be a small form factor antenna that operates in a frequency bandwidth compatible with the sensor 140. In some embodiments, the antenna 120 may be a tunable antenna structure. That is, the antenna 120 may be designed to operate in a large frequency bandwidth (e.g., hundreds of MHz). In order to match the frequency band of the sensor 140, the antenna 120 may be tuned. The tuning may be permanent or reconfigurable. Both options are described in greater detail below. More generally, a plurality of traces of different lengths are provided on the antenna 120. A particular frequency bandwidth is selected for the antenna 120 by disconnecting traces that support unnecessary frequency bands from the remainder of the antenna circuitry.

In the illustrated embodiments of FIGS. 1A-1D, the sensor modules 100 include a single antenna 120 and sensor 140. However, it is to be appreciated that a plurality of sensor 140 and antenna 120 pairs may be provided across the substrate 101. In some embodiments, each of the sensors 140 are the same type of sensor. For example, all sensors 140 may be temperature sensors 140. As such, a spatial mapping of temperature may be provided across the substrate 101. Though, in other embodiments different types of sensors 140 may be provided on a single substrate 101. For example, a first sensor 140 may be a temperature sensor 140 and a second sensor 140 may be a radical density sensor 140. In such an embodiment, the different antennas 120 may be tuned to different frequency bands in order to accommodate the different types of sensors 140.

In an embodiment, the sensor 140 and antenna 120 pair may have a form factor that is compatible with the small spacing that is provided in many plasma processing chambers. For example, the thickness of the sensor 140 and/or the antenna 120 may be up to approximately 5 mm, up to approximately 3 mm, or up to approximately 2 mm. More generally, a thickness of the antenna 120 may be a fraction of the wavelength of electromagnetic radiation propagated by the antenna 120. For example, the thickness may be up to one-half the wavelength, up to one-fifth the wavelength, or up to one-tenth the wavelength.

In an embodiment, the footprint of the sensor 140 and the antenna 120 may also be compact. For example, a total area of the sensor 140 and antenna 120 pair may be approximately one inch by one inch. With respect to the antenna 120, an edge length may be approximately 50 mm or less, approximately 30 mm or less, or approximately 20 mm or less.

Figure 2:
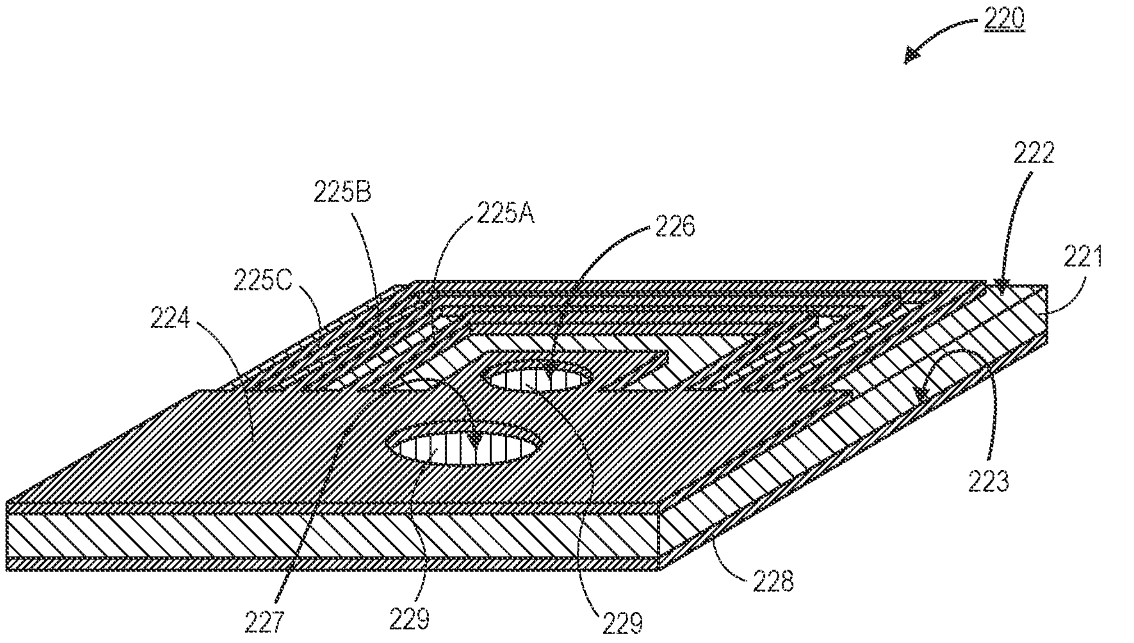
FIG. 2 is a perspective view illustration of an antenna that is configured to be tuned to a desired operating frequency bandwidth, in accordance with an embodiment.

Referring now to FIG. 2, a perspective view illustration of an antenna 220 is shown, in accordance with an embodiment. In an embodiment, the antenna 220 may comprise a substrate 221. The substrate 221 may be a dielectric material. For example, the substrate 221 may be an organic dielectric material, a glass, a ceramic, or the like. The permittivity of the substrate 221 may be altered in order to modulate the size of the antenna 220. For example, higher permittivity may allow for smaller antenna 220 form factors. The substrate 221 may have a first surface 222 (i.e., a top surface 222) and a second surface 223 (i.e., a bottom surface 223).

In an embodiment, a first pad 224 is provided over the first surface 222. The first pad 224 may be an electrically conductive material. For example, the first pad 224 may comprise copper, aluminum, or any other metal or alloy of metals. In an embodiment, a plurality of traces 225 are also provided over the first surface 222. For example, three traces 225A, 225B, and 225C are shown in FIG. 2. Though, any number of traces 225 may be used in other embodiments. Each of the traces 225 may have a different length (as measured from a first end that connects to the first pad 224 at a first location to a second end that connects to the first pad 224 at a second location). For example, trace 225A is the shortest and trace 225C is the longest.

In an embodiment, the different trace lengths enable tuning the antenna 220 to different frequency bandwidths. During configuration of the antenna 220, frequency bandwidths that are not desired can be omitted by disconnecting the traces 225 corresponding to the omitted frequencies. For example, during operation a single one of the traces 225 may be connected to the first pad 224. The antenna 220 in FIG. 2 includes all traces 225 being attached to the first pad 224 before any frequency bandwidth configuration has taken place.

In an embodiment, the traces 225 may be arranged in any configuration or pattern. For example, in FIG. 2 the traces 225 have a substantially "C-shaped" layout. That is, a first portion of the trace 225 extends out substantially orthogonally from the edge of the first pad 224 at a first location, a second portion of the trace 225 extends substantially parallel to the edge of the first pad 224, and a third portion of the trace 225 extends out substantially orthogonally from the edge of the first pad 224 at a second location. The second portion of the trace 225 may couple the first portion of the trace 225 to the third portion of the trace 225. In an embodiment, the plurality of traces 225 may be "nested" with each other. As used herein, "nested" may refer to traces that are of similar shape but with different sizes that are placed inside of each other. For example, the longest trace 225C is the outermost trace 225, the next smallest trace 225B is set inside the trace 225C, and the smallest trace 225A is set inside the trace 225B.

In an embodiment, a second pad 228 may be provided over the second surface 223 of the substrate 221. The second pad 228 may be an electrically conductive material. For example, the second pad 228 may comprise copper, aluminum, or any other metal or alloy of metals. In an embodiment, the second pad 228 may be coupled to the first pad 224 through an electrically conductive liner 229 that passes through a first hole 226 in the antenna 220. The first hole 220 may pass through the first pad 224, the substrate 221, and the second pad 228.

In an embodiment, a second hole 227 may also be provided through the first pad 224 and the substrate 221. The second hole 227 may be lined with an electrically conductive liner 229, which couples the first pad 224 to a third pad (not visible in FIG. 2). The third pad may also be on the second surface 223, and the third pad is electrically isolated from the second pad 228, as will be described in greater detail below. In an embodiment the first hole 226 and the second hole 227 may be circular holes. Though, holes 226 and 227 may also have other shapes in some embodiments. The first hole 226 may have a different diameter than the second hole 227. For example, the first hole 226 may be smaller than the second hole 227.

Figure 3A:
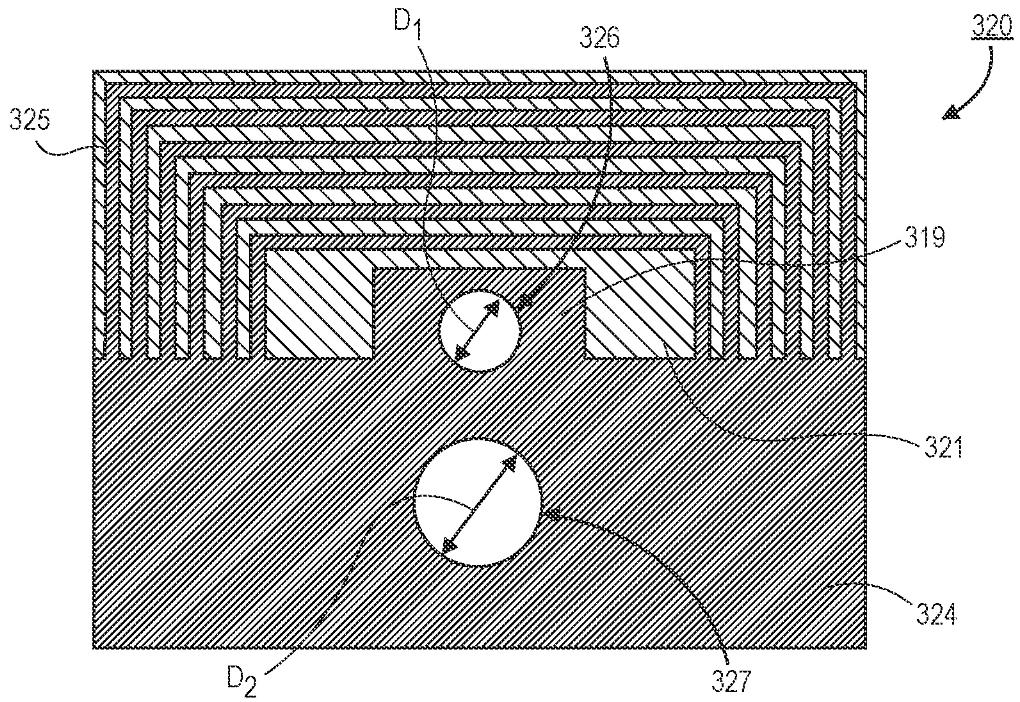
FIG. 3A is a plan view illustration of a top surface of an antenna with a pair of holes in a first pad and an array of traces of various lengths connected to the first pad, in accordance with an embodiment.
Figure 3B:
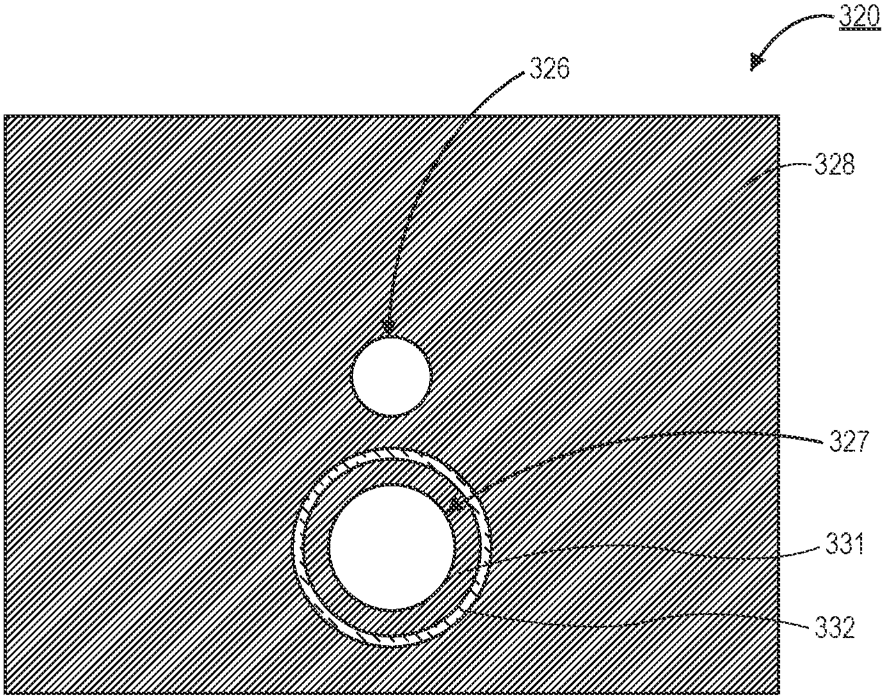
FIG. 3B is a plan view illustration of a bottom surface of the antenna with a second pad, an insulating ring, and a third pad, in accordance with an embodiment.

Referring now to FIGS. 3A and 3B, plan view illustrations of the top surface (FIG. 3A) and the bottom surface (FIG. 3B) of an antenna 320 are shown, in accordance with an embodiment. The antenna 320 may have any suitable form factor. In a particular embodiment, one or more of the edges of the antenna 320 may have a maximum length that is up to approximately 50 mm, up to approximately 30 mm, or up to approximately 20 mm. A thickness of the antenna 320 may be up to approximately 5 mm, or up to approximately 3 mm. More generally, a thickness of the antenna may be a fraction of the wavelength of electromagnetic radiation propagated by the antenna 320. For example, the thickness may be up to one-half the wavelength, up to one-fifth the wavelength, or up to one-tenth the wavelength.

Referring now to FIG. 3A, a plan view illustration of the top surface of the antenna 320 is shown, in accordance with an embodiment. As shown, a first pad 324 is provided over the substrate 321. The first pad 324 may be a substantially rectangular plane over a portion of the substrate 321. In some embodiments, the first pad 324 may also comprise a protrusion 319. The protrusion 319 may extend out from an edge of the first pad 324 that is contacted by one or more of the traces 325.

In an embodiment, a first hole 326 and a second hole 327 pass through the first pad 324. The first hole 326 may have a first diameter $D_1$ and the second hole 326 may have a second diameter $D_2$. In an embodiment, the second diameter $D_2$ is greater than the first diameter $D_1$. The second diameter $D_2$ can also be less than the first diameter $D_1$ in other embodiments. The second diameter $D_2$ may also be substantially equal to the first diameter $D_1$ in some instances. The diameters $D_1$ and $D_2$ can be chosen in order to provide certain electrical properties for the antenna 320. For example, different diameters $D_1$ and $D_2$ can be used in order to control impedance matching performance. In some embodiments the diameters $D_1$ and $D_2$ may both be approximately 10 mm or smaller, or approximately 5 mm or smaller. In a particular embodiment, the first diameter $D_1$ may be approximately 3 mm and the second diameter $D_2$ may be approximately 5 mm. In an embodiment, the first hole 326 may be positioned at least partially within the protrusion 319. Though in other embodiments, both the first hole 326 and the second hole 327 may be positioned through the first pad 324.

In an embodiment, the plurality of traces 325 includes six traces 325 with different lengths. In other embodiments, the plurality of traces 325 may include two or more traces 325, five or more traces 325, or ten or more traces 325. In an embodiment, the traces 325 may each have a total length that is between approximately 10 mm and approximately 100 mm. Though, longer or shorter traces 325 may also be used in some embodiments. The traces 325 may be arranged in a nested pattern. For example, the traces 325 in FIG. 3A are roughly C-shaped with first ends connecting to the first pad 324 adjacent to a first side of the protrusion 319 and second ends connecting to the first pad 324 adjacent to a second side of the protrusion 319.

Referring now to FIG. 3B, a plan view illustration of the bottom surface of the antenna 320 is shown, in accordance with an embodiment. As shown, the second pad 328 may occupy a majority of the bottom surface of the substrate 321 (not visible in FIG. 3B). The first hole 326 may pass through the second pad 328. In an embodiment, the second hole 327 may pass through a third pad 331. The third pad 331 may be a ring that surrounds the second hole 327. Though, the third pad 331 may have any suitable shape.

In an embodiment, an electrically insulating ring 332 may electrically isolate the second pad 328 from the third pad 331. The insulating ring 332 may be a polymeric material, such as an epoxy, a rubber, or the like. In yet another embodiment, the insulating ring 332 may be the absence of a material. For example, insulating ring 332 may be an air gap or a vacuum. In an embodiment, the ring 332 is concentric with the second hole 327. Though, the ring 332 may have any shape, thickness, and/or positioning that allows for electrical isolation between the second pad 328 and the third pad 331. The electrical isolation provided by the ring 332 allows for the second pad 328 and the third pad 331 to be different electrical terminals that can be coupled to circuitry of the larger sensor module.

Figure 4:
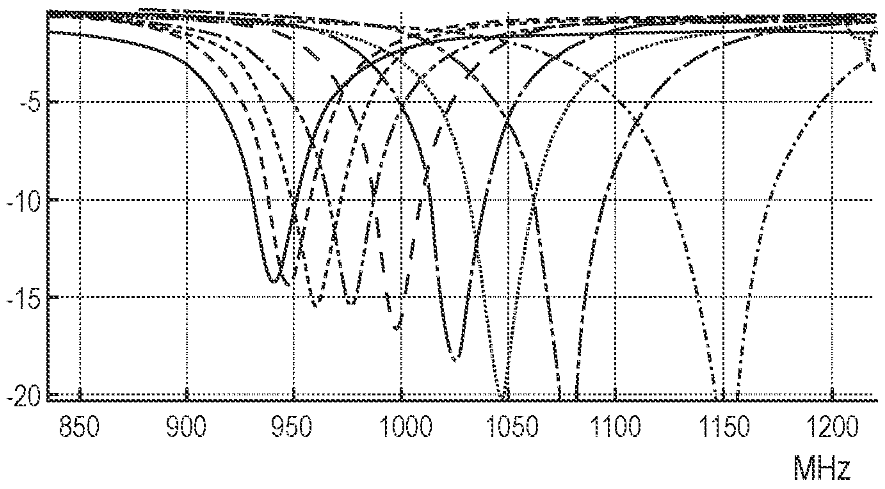
FIG. 4 is a graph of the operating frequency bandwidth for a series of traces that are each a different length, in accordance with an embodiment.

As noted above, the inclusion of multiple traces 325 on the antenna 320 allows for a large initial frequency bandwidth with each trace 325 supporting a smaller fraction of the overall bandwidth. An example of such a solution is shown in FIG. 4. In FIG. 4, the bandwidth of each trace 325 is indicated by a different line type. As shown, the total available frequency can range from approximately 900 MHz to approximately 1.2 GHz. More generally, embodiments disclosed herein may be capable of supporting frequencies between approximately 750 MHz and approximately 1.5 GHz. That is, a given antenna 320 can support a frequency bandwidth that spans hundreds of MHz. In order to select a specific, smaller, frequency bandwidth to support a given sensor, the traces supporting undesired frequencies are disconnected from the antenna circuitry. This can be done through mechanical processes (e.g., severing the traces) or through the control of a bank of switches. Severing the traces allows for a permanent selection of a desired frequency bandwidth, whereas the use of a bank of switches may allow for a reconfigurable antenna.

Figure 5:
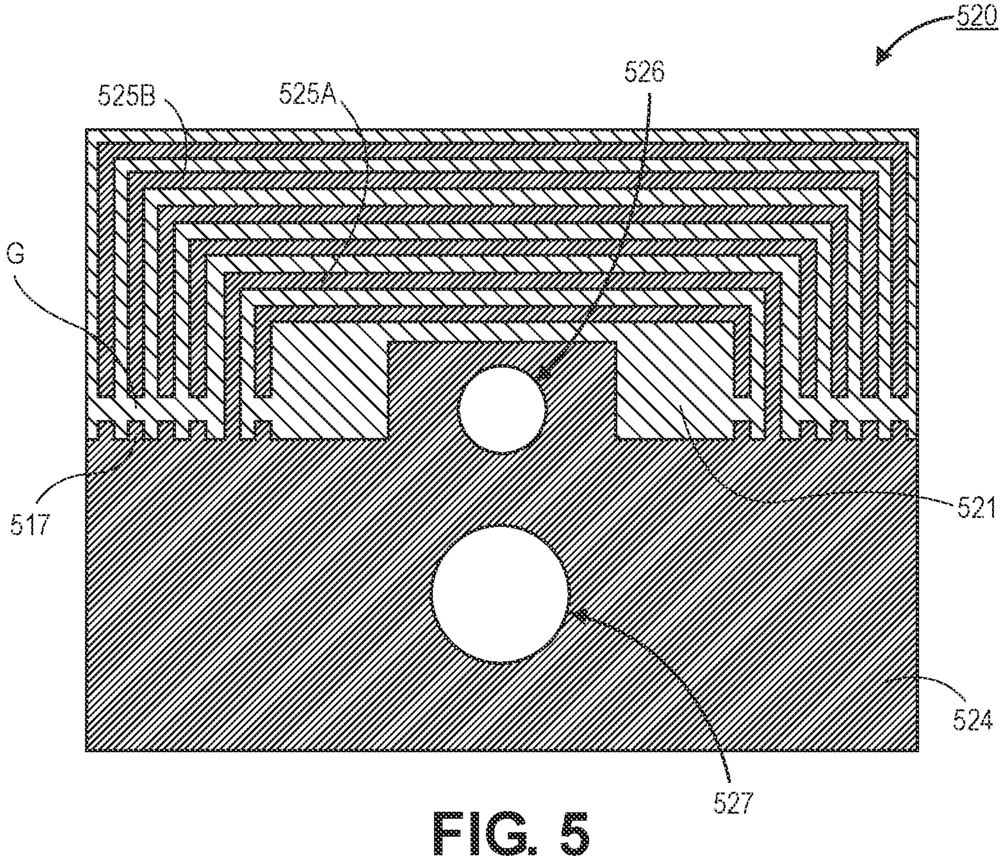
FIG. 5 is a plan view illustration of an antenna that is configured to operate at a series of different frequency bandwidths that has been modified to operate at a single frequency bandwidth, in accordance with an embodiment.

Referring now to FIG. 5, a plan view illustration of a top surface of an antenna 520 is shown, in accordance with an embodiment. The antenna 520 may include a substrate 521 with a first pad 524 over the substrate 521. A first hole 526 and a second hole 527 may be provided through the first pad 524 and the substrate 521. In an embodiment, a plurality of traces 525 may be provided on the substrate 521. In an embodiment, the traces 525 may have different lengths in order to support different frequency bandwidths.

In an embodiment, the antenna 520 has been configured to support a single frequency bandwidth. More particularly, trace 525A remains connected to the first pad 524 at both a first end and a second end. The remainder of the traces 525B have at least one end disconnected from the first pad 524. In FIG. 5, both ends of the traces 525B are disconnected from the first pad 524. For example, a gap G is provided between ends of the traces 525B and stubs 517 that extend out from the first pad 524. In some embodiments, the stubs 517 may be omitted. For example, the gap G may be provided between the edge of the first pad 524 and the ends of the traces 525B.

In an embodiment, the disconnection of the traces 525B from the first pad 524 may be made with a cutting process, a patterning process (e.g., etching), or any other material removal process. It is to be appreciated that the severed traces 525B will no longer significantly impact performance of the antenna 520. However, the traces 525B may persist on the antenna 520 as a residual feature that indicates that antenna 520 was initially capable of supporting a broader frequency bandwidth.

Figure 6:
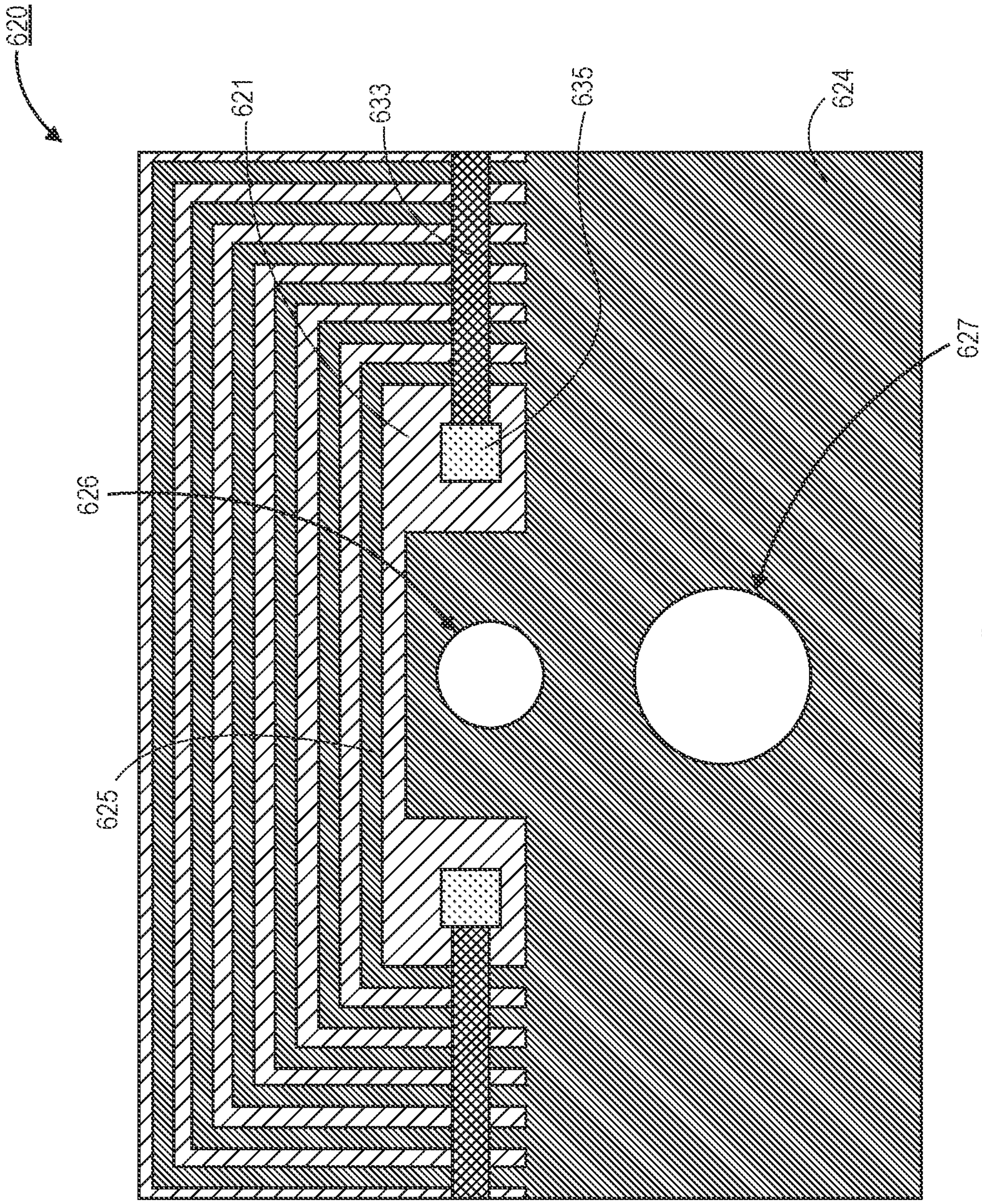
FIG. 6 is a plan view illustration of an antenna that is reconfigurable to operate at a series of different frequency bandwidths through the operation of a bank of switches, in accordance with an embodiment.

Referring now to FIG. 6, a plan view illustration of a top surface of an antenna 620 is shown, in accordance with an embodiment. In an embodiment, the antenna 620 includes a first pad 624 over a substrate 621. A first hole 626 and a second hole 627 may pass through the first pad 624 and the substrate 623. In an embodiment, a plurality of traces 625 are provided on the substrate 621. The traces 625 may each have a different length in order to support different frequency bands for the antenna 620.

In an embodiment, the antenna 620 is reconfigurable in order to switch between different frequency bands. The selection of different frequency bands is enabled through the use of one or more switches. For example, a bank of switches 633 may extend across the traces 625. The bank of switches 633 may be controlled by a controller 635. The controller 635 may include logic, power, and/or memory in order to actively switch between which trace 625 is connected to the first pad 624. At a given time, the bank of switches 633 can be configured so that one switch is engaged to connect one of the traces 625 to the first pad 624 and the remainder of the switches are engaged to create an open circuit between the remainder of the traces 625 and the first pad 624. If the frequency bandwidth needs to be changed, the bank of switches 633 can be reconfigured to connect a different trace 625 to the first pad 624.

Figure 7:
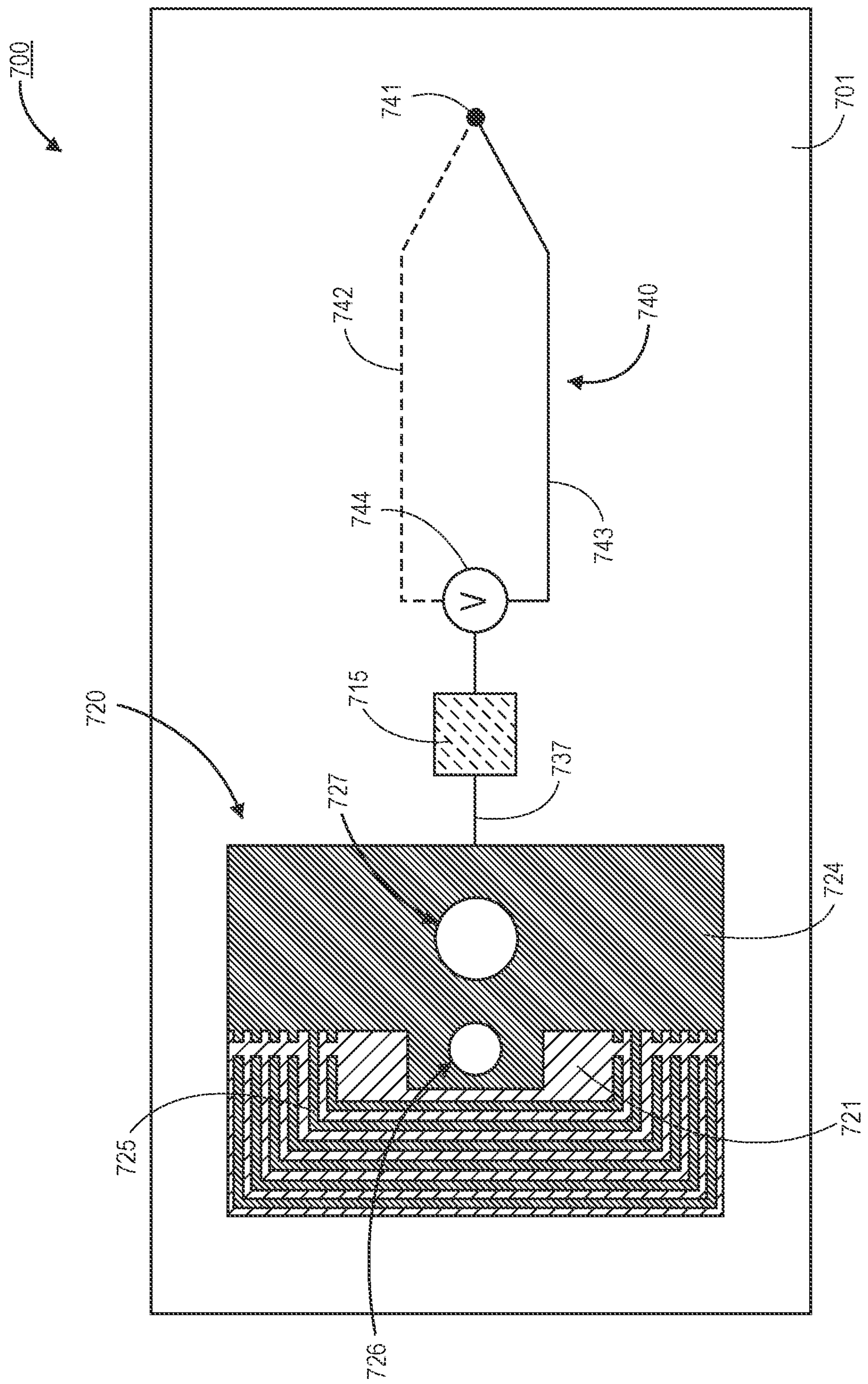
FIG. 7 is a plan view illustration of a sensor module with a temperature sensor, a matching element, and a configurable antenna on a substrate, in accordance with an embodiment.

Referring now to FIG. 7, a plan view illustration of a sensor module 700 is shown, in accordance with an embodiment. In an embodiment, the sensor module 700 may comprise a substrate 701. The substrate 701 may be similar to any of the substrate 101 described in greater detail above. In an embodiment, a sensor 740 and an antenna 720 may be provided on the substrate 701. The antenna 720 may be electrically coupled to the sensor 740 through an interconnect 737, such as a trace, wire, or the like. A matching element 715 may be provided between the sensor 740 and the antenna 720. The matching element 715 may be similar to the matching element 115 described in greater detail above.

While the sensor 740 may be any suitable sensor device, such as those described in greater detail herein, the sensor 740 shown in FIG. 7 is a temperature sensor. More particularly, the sensor 740 is a thermocouple. As such, the sensor 740 may have a contact point 741 with a first wire 742 and a second wire 743 attached to the contact point 741. The first wire 742 and the second wire 743 may connect to a voltage output 744 that determines a voltage difference between the first wire 742 and the second wire 743. The voltage difference can be converted to a single that can be propagated to an external device through the antenna 720.

In an embodiment, the antenna 720 may be similar to any of the antenna structures described herein. For example, the antenna 720 may include a substrate 721 with a first pad 724. Holes 726 and 727 may pass through the first pad 724 and the substrate 721 to connect to a second pad (not shown) and a third pad (not shown) on the backside of the sensor 720. A first end and a second end of one of the traces 725 may be connected to a the first pad 724. The remainder of the traces 725 may be severed or otherwise electrically disconnected from the first pad 724.

In FIG. 7, the antenna 720 and sensor 740 are arranged in a side-by-side configuration. However, it is to be appreciated that embodiments may also include stacked configurations. For example, the sensor 740 may be stacked above the antenna 720 or provided below the antenna 720. That is, the sensor 740 may be entirely within a footprint of the antenna 720 or at least partially within a footprint of the antenna 720. Stacked configurations may provide a more compact structure that allows for a larger number of sensors to be integrated in the sensor module 700.

Figure 8:
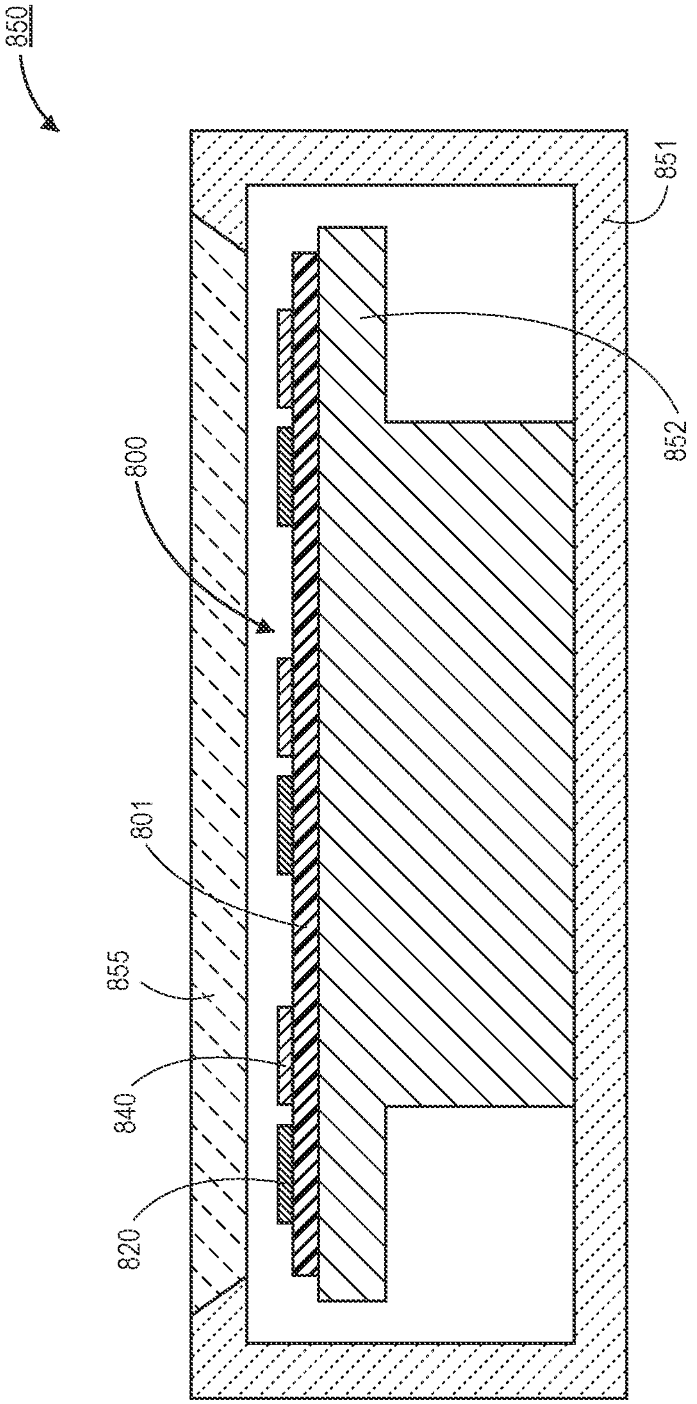
FIG. 8 is a cross-sectional illustration of a processing chamber with a sensor module supported between a pedestal and a showerhead, in accordance with an embodiment.

Referring now to FIG. 8, a cross-sectional illustration of a chamber 850 is shown, in accordance with an embodiment. In an embodiment, the chamber 850 may be a semiconductor processing chamber, such as, but not limited to, a vacuum chamber, a plasma chamber, an annealing chamber, an etching chamber, a deposition chamber (e.g., chemical vapor deposition (CVD), physical vapor deposition (PVD), atomic layer deposition (ALD), etc.), or the like.

In an embodiment, the chamber 850 may include an enclosure 851. The enclosure 851 may be formed from one or more components. In some instances, the enclosure 851 may further comprise internal liners, coatings, or the like. A pedestal 852 may be provided in the chamber 850 to support substrates or (as in the case shown in FIG. 8) a sensor module 800. The chamber 850 may also include a showerhead 855 or other gas distribution device for flowing one or more processing gasses into the chamber 850.

In an embodiment, the sensor module 800 may be similar to any of the sensor modules described in greater detail herein. In an embodiment, the sensor module 800 may comprise a substrate 801. One or more sensor 840 and antenna 820 pairs may be distributed across a surface of the substrate 801. The sensors 840 may be similar to any of the sensors described herein. For example, the sensors 840 may be suitable for measuring one or more of temperature, pressure, moisture, deposition rates, etch rates, electron density, or radical density. In an embodiment, the antennas 820 may be configured to support a specific frequency bandwidth through the selective disconnection of one or more traces on the antenna substrate, similar to any of the embodiments described in greater detail herein.

In an embodiment, the sensor module 800 is sized to be compatible with wafer handling tools and robots coupled to the chamber 850. That is, the sensor module 800 can be inserted through doors, slit valves, etc. that may be integrated into the enclosure 851. The sensor module 800 can be inserted into the chamber 850 in order to monitor a given process and provide feedback to an external device (e.g., computer, server, etc.).

Figure 9:
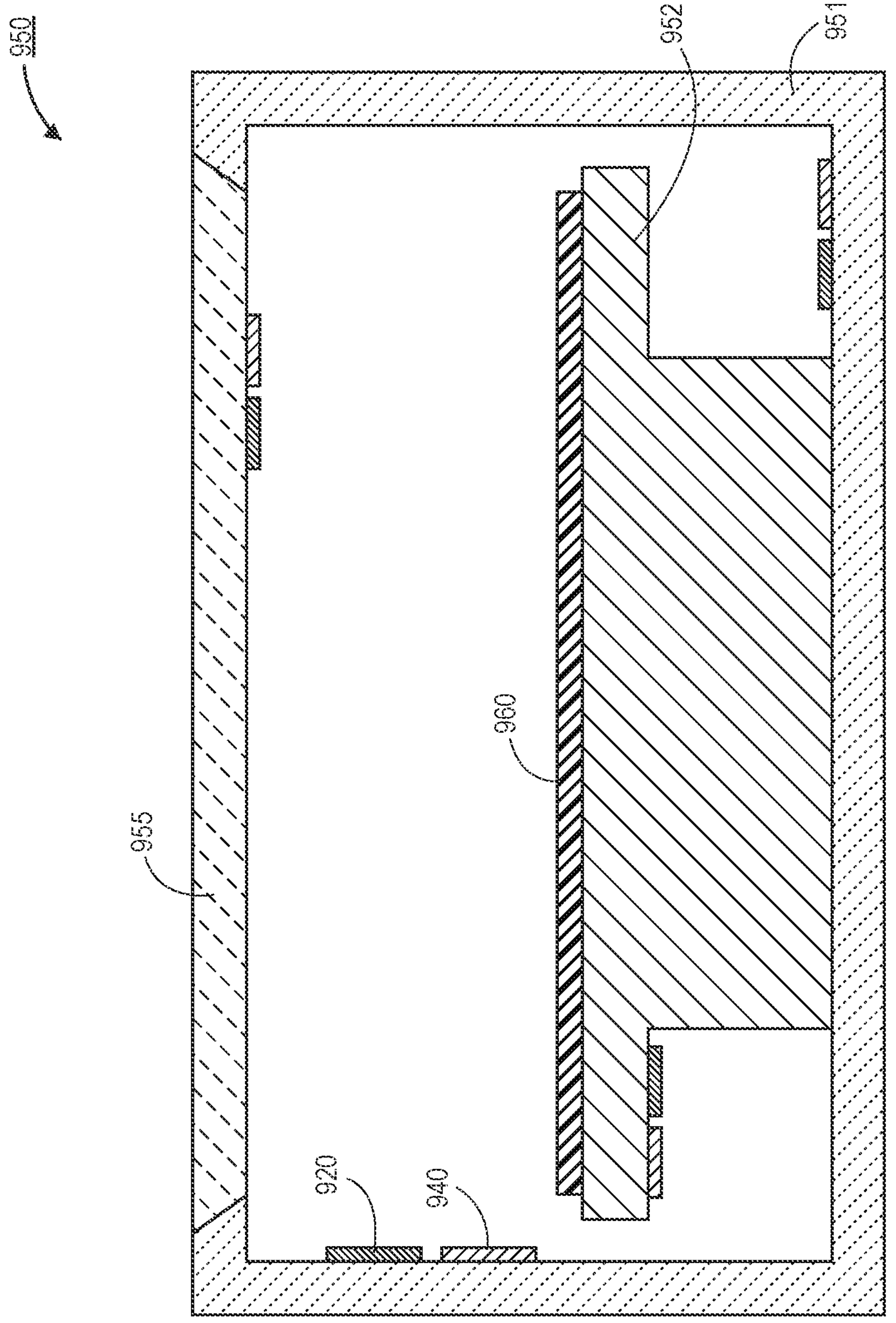
FIG. 9 is a cross-sectional illustration of a processing chamber with a plurality of sensor modules distributed about various interior surfaces of the processing chamber, in accordance with an embodiment.

Referring now to FIG. 9, a cross-sectional illustration of a chamber 950 is shown, in accordance with an additional embodiment. In an embodiment, the chamber 950 may include an enclosure 951, pedestal 952, and showerhead 955. The enclosure 951, pedestal 952, and showerhead 955 may be similar to the enclosure 851, pedestal 852, and showerhead 855 described in greater detail above. In an embodiment, a substrate 960 may be provided on the pedestal 952. The substrate 960 may be a workpiece, such as a wafer with devices that are being fabricated in the chamber 950.

In an embodiment, one or more antenna 920 and sensor 940 pairs may be distributed throughout the chamber 950 in order to monitor various processing conditions. For example, the pairs may be provided on interior surfaces of the enclosure 951 (including liners and coatings within the chamber 950), on surfaces of the pedestal 952, and/or on surfaces of the showerhead 955. More generally, the compact size, environmental resistance, and wireless power delivery provides flexibility to place sensors 940 and antennas 920 at many different locations within the chamber 950.

In an embodiment, the sensors 940 and antennas 920 can be permanent or semi-permanent fixtures within the chamber 950. That is, the sensors 940 and antennas 920 may remain in the chamber 950 during the processing of substrates 960. As such, real-time process monitoring of the substrate 960 can be implemented in order to improve control of the processing. The data obtained during processing of the substrate 960 can be used for one or more of: 1) feed-forward information for use in subsequent processing; 2) defect detection metrology; 3) feed-back information to improve previous operations in the process flow; and/or 4)

a learning data set for artificial intelligence (AI) or machine learning (ML) modules used to improve processing.

Figure 10:
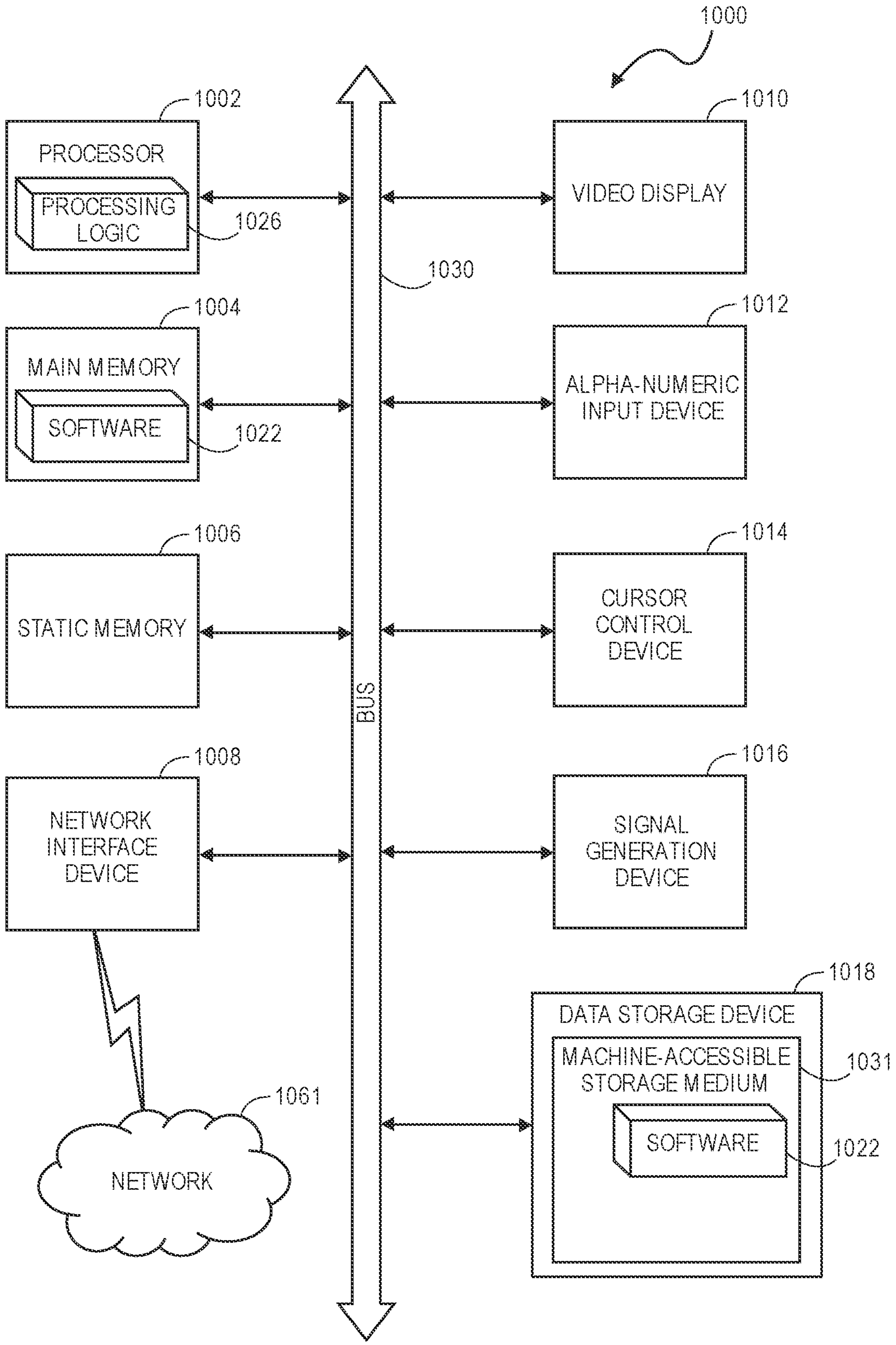
FIG. 10 illustrates a block diagram of an exemplary computer system that may be used in conjunction with a processing tool, in accordance with an embodiment.

Referring now to FIG. 10, a block diagram of an exemplary computer system 1000 of a processing tool is illustrated in accordance with an embodiment. In an embodiment, computer system 1000 is coupled to and controls processing in the processing tool. Computer system 1000 may be connected (e.g., networked) to other machines in a Local Area Network (LAN), an intranet, an extranet, or the Internet. Computer system 1000 may operate in the capacity of a server or a client machine in a client-server network environment, or as a peer machine in a peer-to-peer (or distributed) network environment. Computer system 1000 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 1000, the term "machine" shall also be taken to include any collection of machines (e.g., computers) that individually or jointly execute a set (or multiple sets) of instructions to perform any one or more of the methodologies described herein.

Computer system 1000 may include a computer program product, or software 1022, having a non-transitory machine-readable medium having stored thereon instructions, which may be used to program computer system 1000 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 1000 includes a system processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

System processor 1002 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 1002 may also be one or more special-purpose processing devices such as an application specific integrated circuit (ASIC), a field programmable gate array (FPGA), a digital signal system processor (DSP), network system processor, or the like. System processor 1002 is configured to execute the processing logic 1026 for performing the operations described herein.

The computer system 1000 may further include a system network interface device 1008 for communicating with other devices or machines. The computer system 1000 may also include a video display unit 1010 (e.g., a liquid crystal display (LCD), a light emitting diode display (LED), or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-accessible storage medium 1032 (or more specifically a computer-readable storage medium) on which is stored one or more sets of instructions (e.g., software 1022) embodying any one or more of the methodologies or functions described herein. The software 1022 may also reside, completely or at least partially, within the main memory 1004 and/or within the system processor 1002 during execution thereof by the computer system 1000, the main memory 1004 and the system processor 1002 also constituting machine-readable storage media. The software 1022 may further be transmitted or received over a network 1020 via the system network interface device 1008. In an embodiment, the network interface device 1008 may operate using RF coupling, optical coupling, acoustic coupling, or inductive coupling.

While the machine-accessible storage medium 1032 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. An antenna, comprising:
- a dielectric substrate with a first surface and a second surface opposite from the first surface;
- an electrically conductive first pad on the first surface;
- a plurality of traces on the first surface, wherein lengths of the plurality of traces are non-uniform;
- an electrically conductive second pad on the second surface;
- a first hole through the first pad, the substrate, and the second pad, wherein a first liner along sidewalls of the first hole electrically couples the first pad to the second pad; and
- a second hole through the first pad and the substrate, wherein a second liner along sidewalls of the second hole electrically couples the first pad to an electrically conductive third pad on the second surface; and
- an electrically insulating ring between the second pad and the third pad.

2. The antenna of claim 1, wherein a single one of the plurality of traces has a first end that contacts the first pad at a first location and a second end that contacts the first pad at a second location.

3. The antennal of claim 2, wherein a remainder of the plurality of traces have ends that are spaced away from the first pad, and wherein each of the remainder of the plurality of traces have different lengths.

4. The antenna of claim 1, wherein the plurality of traces are arranged in a nested pattern.

5. The antenna of claim 1, further comprising a bank of switches between the plurality of traces and the first pad, and wherein the bank of switches is configured to be actively controlled to selectively couple one of the plurality of traces to the first pad.

6. The antenna of claim 1, wherein a total thickness of the antenna is up to approximately one-tenth a wavelength of electromagnetic radiation propagated by the antenna.

7. The antenna of claim 1, wherein a length of the antenna is up to approximately 30 mm, and wherein a width of the antenna is up to approximately 30 mm.

8. The antenna of claim 1, wherein an operating frequency range of the antenna is between approximately 750 MHz and approximately 1.5 GHz.

9. The antenna of claim 1, wherein the first hole has a first diameter and the second hole has a second diameter that is different than the first diameter.

* * * * *